United States Patent [19]
Maier

[11] 3,913,645
[45] Oct. 21, 1975

[54] CLAMPING MECHANISM FOR BLADES IN ROTARY MATERIAL REMOVING TOOLS

[75] Inventor: Gerhard Maier, Brackwede, Germany

[73] Assignee: Maschinenfabrik B. Maier KG, Brackwede, Germany

[22] Filed: July 30, 1974

[21] Appl. No.: 493,062

[30] Foreign Application Priority Data
Aug. 3, 1973   Germany............................ 2339325

[52] U.S. Cl.............. 144/218; 29/105 R; 144/230
[51] Int. Cl.²...................... B27G 13/00; B26D 1/12
[58] Field of Search............ 29/105 R; 144/218, 230

[56] References Cited
UNITED STATES PATENTS

| | | | |
|---|---|---|---|
| 1,305,650 | 6/1919 | Heggen | 144/230 |
| 1,861,787 | 7/1932 | Buchan | 144/230 |
| 2,598,933 | 6/1952 | Nevin | 144/230 |
| 3,014,511 | 12/1961 | Kirsten | 144/230 |
| 3,237,276 | 1/1966 | VonDerOhe | 144/230 X |
| 3,280,865 | 10/1966 | Alexander | 144/218 |
| 3,854,511 | 12/1974 | Maier | 144/230 |

*Primary Examiner*—Harrison L. Hinson
*Attorney, Agent, or Firm*—Michael S. Striker

[57] ABSTRACT

A material removing tool, wherein a rotary carrier supports several holders for discrete blades each having an elongated cutting edge and a rear edge which is parallel to the cutting edge and abuts against a shoulder of the respective holder. The end surfaces of each blade have triangular notches for pins which are provided on the respective holder and one of which is biased toward the other pin by a helical spring. The pins thereby bear against inclined cam faces which bound portions of the respective notches and cause the rear edge to remain in abutment with the respective shoulder. A blade can be removed after the movable pin is shifted away from the other pin.

10 Claims, 3 Drawing Figures

CLAMPING MECHANISM FOR BLADES IN ROTARY MATERIAL REMOVING TOOLS

BACKGROUND OF THE INVENTION

The present invention relates to material removing tools in general, and more particularly to improvements in clamping mechanisms for the blades of rotary tools which are employed for removal of material from wood or the like. Still more particularly, the invention relates to improvements in mechanisms for removably or releasably clamping thin blade-like material-removing knives to holders of rotary tools.

It is known to remove shavings from wood by resorting to a tool wherein a rotary carrier supports several holders and each holder supports an expendable blade whose cutting edge extends beyond the cylindrical peripheral surface of the carrier. The blades are subjected to extensive wear so that their useful life is very short; therefore, the tool must be constructed and assembled with a view to allow for convenient access to a blade for the purpose of inspection, inversion (if the blade has several cutting edges) or replacement with a fresh blade. A tool wherein the holders can be rapidly removed, either entirely or in part, is disclosed in my copending application Ser. No. 490,216 filed July 19, 1974 and entitled "Rotary Material Removing Tool with Expendable Blades."

In many presently known rotary tools, the holders for the blades are formed with several projections in the form of pins or studs which extend with minimal clearance into openings of the blades to thereby maintain the blades in predetermined positions with respect to the associated holders and with respect to the carrier in which the holders are mounted. The provision of studs and openings insures an accurate positioning of blades with respect to their holders; however, the manufacturing cost of the blades is high because the openings must be machined with a high degree of precision in order to insure that the cutting edge of each of a series of successively mounted blades will assume a predetermined position with respect to the holder and hence with respect to the carrier of the material removing tool. The center of each opening must be located at a fixed distance from the cutting edge; otherwise, the cutting edge of a preceding blade will remove shavings which are thicker or thinner than the shavings to be removed by the next-following blade.

SUMMARY OF THE INVENTION

An object of the invention is to provide a material removing tool, particularly a rotary tool having several holders for discrete blades, with novel and improved means for clamping the blades to the respective holders in such a way that the cutting edge of each of a series of successively mounted blades invariably assumes a predetermined position with respect to its holder and that the blades need not be formed with accurately machined openings in the form of slots, circular holes or the like.

A further object of the invention is to provide a holder for a flat blade with novel and improved means for clamping the blade in an optimum position in such a way that the blade can be separated from the holder or attached to the holder with little loss in time.

An additional object of the invention is to provide a novel and improved blade for use in rotary material removing tools of the above outlined character.

A further object of the invention is to provide a clamping or retaining mechanism for flat blade-like knives which is simple, which occupies a minimum of space, and which can be mounted on or in holders which are insertable into the carriers of conventional material removing tools.

The invention is embodied in a material removing tool, particularly in a rotary tool for removing shavings from wood or the like, which comprises a holder having a preferably flat supporting surface and an abutment (e.g., an elongated shoulder) extending beyond the supporting surface, a substantially flat knife or blade having an elongated cutting edge, a rear edge which is located opposite and is preferably parallel to the cutting edge, two major surfaces or sides one of which lies against the supporting surface of the holder, and first and second cam faces which may form part of two end surfaces of the blade, and novel and improved clamping means for releasably retaining the rear edge in engagement with the abutment of the holder. The retaining or clamping means comprises first and second projections which are provided on the holder and are adjacent to the first and second cam faces of the blade which lies against the supporting surface of the holder and at least one of which (e.g., the first projection) is movable with respect to the holder, and means for biasing the one projection against the adjacent cam face with a force having a first component which urges the other cam face against the other projection and a second component which urges the rear edge of the blade against the abutment of the holder due to engagement of the cam faces with the respective projections. The blade is separable from the holder upon movement of the one projection away from the respective cam face against the opposition of the biasing means.

If the two edges are parallel to each other and if the two edges of successive blades which are to be attached to the holder are disposed at an identical distance from each other, the improved retaining means automatically insures that the cutting edge of each blade assumes the same position with respect to the holder as long as the rear edge is caused to bear against the abutment of the holder.

In accordance with a presently preferred embodiment of the invention, each of the cam faces makes an acute angle with the rear edge of the blade and the cam faces are inclined in opposite directions. Thus, when a fixed projection engages one of the cam faces and a movable projection bears against the other cam face, the rear edge of the blade is automatically biased against the abutment of the holder because the cam faces act not unlike ramps and the movable projection (e.g., a cylindrical stud or pin) which engages one of the cam faces urges the other cam face against the other projection so that the projections urge the rear edge against the abutment of the holder with a force whose magnitude depends on the nature of the biasing means, on the direction in which the one projection is movable and on the inclination of the cam faces with respect to the rear edge.

The novel features which are considered as characteristic of the invention are set forth in particular in the appended claims. The improved tool itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
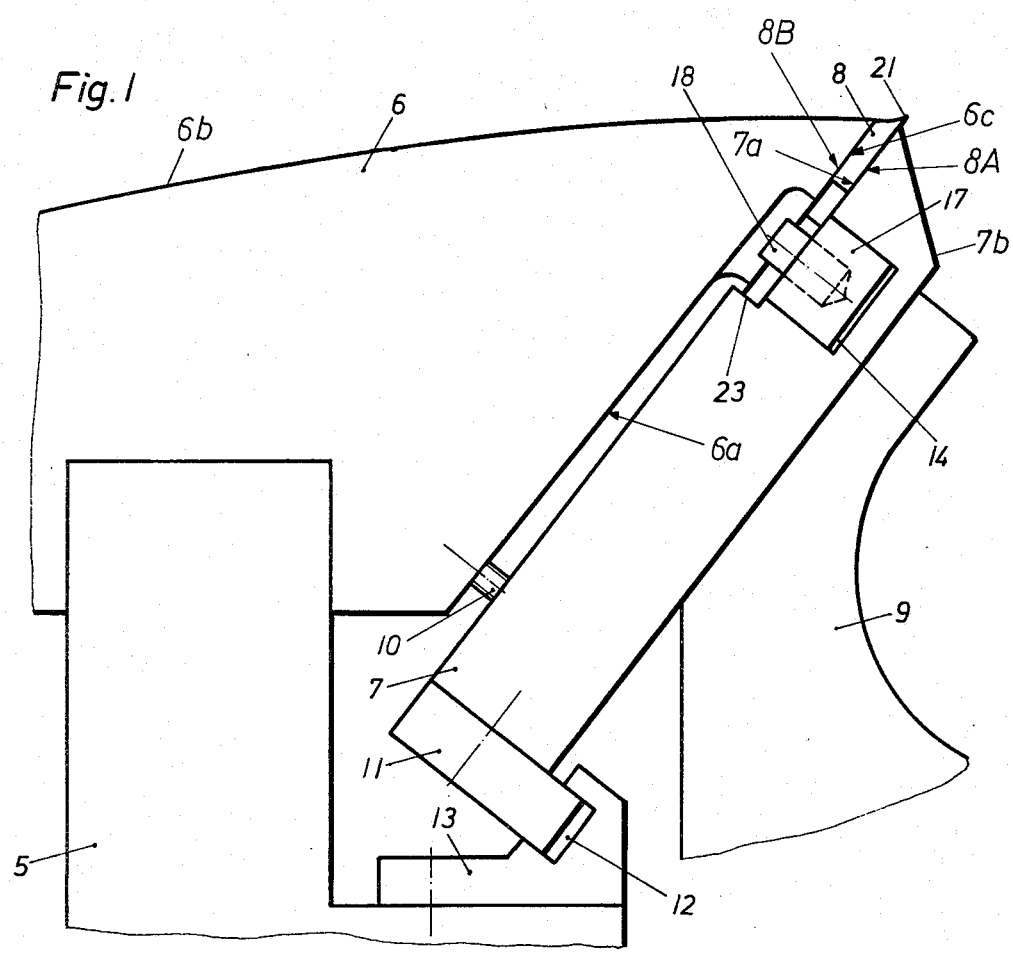
FIG. 1 is a fragmentary end elevational view of a rotary material removing tool having several holders for blades which are secured to their holders by the improved retaining means.

FIG. 1 shows a portion of a rotary material removing tool which is similar to that shown in FIG. 5 of my aforementioned copending patent application Ser. No. 490,216 to which reference may be had, if necessary. The tool comprises a rotary carrier consisting of a hub 5, several wearing plates 6 which are secured to the hub 5 by means of screws, bolts or analogous fasteners, relatively small separable guide portions 13 which are bolted or otherwise fastened to the hub 5, several elongated flat holders 7 (only one shown), and discrete flat blades 8, one for each holder 7. The rear or inner edge face of the illustrated holder 7 abuts against an elongated locating member 11 which is separably secured thereto by screws or the like and extends into an elongated groove 12 of the adjacent guide portion 13. The groove 12 is parallel to the axis of rotation of the tool and the holder 7 can be withdrawn (at least in part) from the carrier by moving it toward or away from the observer of FIG. 1 whereby the locating member 11 slides in the groove 12. A fully inserted holder 7 is biased against a stop 10 on the wearing plate 6 by a wedge 9 which is preferably biased by one or more springs, not shown.

The outer portion of the holder 7 has a preferably flat supporting surface 7a and an elongated abutment or shoulder 23 which extends beyond the surface 7a toward the adjacent surface 6a of the wearing plate 6. The abutment 23 serves as a stop for the elongated rear edge 22 of the blade 8 which further comprises an elongated cutting edge 21 located opposite and being preferably parallel to the rear edge 22. Thus, when the rear edge 22 engages the abutment 23, the cutting edge 21 projects to a predetermined extent beyond the front surface 7b of the holder 7 and beyond the convex peripheral surface 6b of the adjacent wearing plate 6. If the distance between the edges 21, 22 of successive blades 8 which are to be clamped to the holder 7 is the same, the cutting edge 21 of each blade will project beyond the surfaces 7b and 6b to the same extent as the cutting edge which is shown in FIG. 1, provided that the rear edge 22 of each blade is held in engagement with the abutment 23 of the holder 7.

Figure 3:
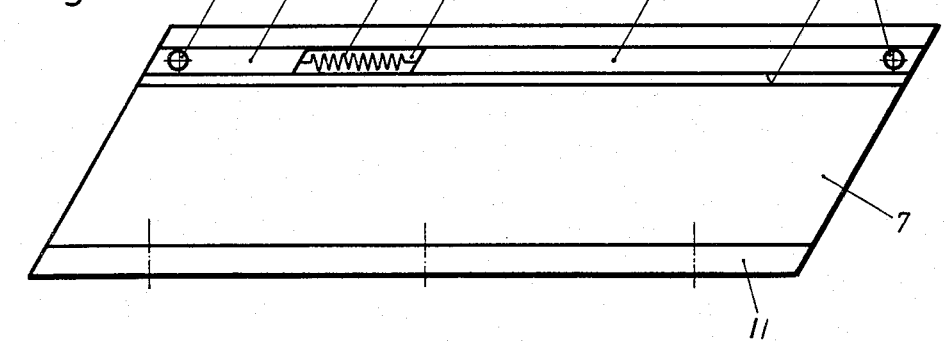
FIG. 3 is an elevational view of a holder.

In accordance with a feature of the invention, the clamping or retaining means for the blade 8 comprises two projections 16 and 18 which are mounted on the holder 7. To this end, the holder 7, has a longitudinally extending recess or groove 14 which is parallel to the surface 7b and guide 11. The projection 16 has an elongated strip-shaped portion 15 which is received in the right-hand portion of the recess 14, as viewed in FIG. 3, and is secured to the holder 7 by means of screws or analogous fasteners, not shown. The other projection 18 also comprises a strip-shaped portion 17 which is slidable in the left-hand portion of the recess 14 and is pulled in a direction toward the portion 15 by a biasing means here shown as a helical spring 19. The latter is attached to portion 15 and/or to the holder 7 and is further coupled to the portion 17 so that it tends to move the projection 18 toward the projection 16.

Figure 2:
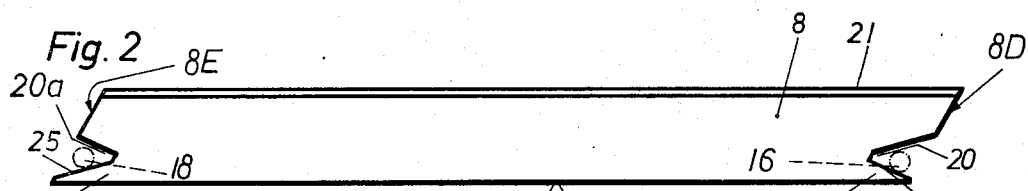
FIG. 2 is an elevational view of a blade.

The blade 8 has two major sides or surfaces 8A, 8B the former of which lies against the supporting surface 7a and the latter of which abuts against a surface 6c of the wearing plate 6 close to the surface 6b. The blade 8 is further provided with two cam faces 24, 25 which form part of the respective end surfaces 8D, 8E of the blade and each of which makes an acute angle with the rear edge 22. The cam faces 24, 25 are inclined in opposite directions, i.e., the cam face 24 slopes upwardly toward the cutting edge 21 in a direction from the right to the left, as viewed in FIG. 2, and the cam face 25 slopes upwardly toward the cutting edge 21 in a direction from the left to the right, as viewed in FIG. 2. The angle between the cam face 24 and the rear edge 22 may but need not be identical with the angle between 22 and 25.

It will be noted that the cam faces 24, 25 respectively flank or bound portions of two substantially triangular notches or recesses 20, 20a which are provided in the end surfaces 8D, 8E of the blade 8. The provision of notches 20, 20a results in the formation of two wedge-like projections 124, 125 which are respectively disposed between the cam face 24 and rear edge 22 on the one hand and the cam face 25 and rear edge 22 on the other hand. When the tool is in use, the rear edge 22 is pressed against the abutment 23 with a force greatly exceeding the bias of the spring 19 because the cutting edge 21 removes material from a workpiece. The blade 8 is held against buckling because its major surfaces 8A and 8B respectively abut against the surfaces 7a and 6c, and the wedge 9 biases the holder 7 toward the wearing plate 6 and against the stop 10.

When a fresh blade 8 is to be separably attached to the holder 7 which is shown in FIG. 1, the holder is withdrawn from the carrier 5, 6, 13 by moving it at right angles to the plane of FIG. 1 so that the supporting surface 7a is exposed. The operator then pushes or pulls the projection 18 away from the projection 16 against the opposition of the spring 19 and places the major surface 8A of a fresh blade 8 against the supporting surface 7a so that the rear edge 22 of the fresh blade is adjacent to or already engages the abutment 23. The retracted projection 18 is thereupon released whereby the spring 19 contracts and propels the projection 18 against the cam face 25 with a predetermined force. Such force causes the blade 8 to move its cam face 24 against the projection 16, i.e., the cam face 24 bears against the projection 16. At the same time, the force which is supplied by the spring 19 causes the projections 18, 16 to respectively urge the projections 125, 124 toward the abutment 23 so that the latter is engaged by the rear edge 22 whereby the cutting edge 21 extends beyond the surface 7b of the holder 7. It can be said that the force which is supplied by the spring 19 has two components one of which is parallel to the rear edge 22 and urges the projection 18 toward the projection 16 whereby the projection 18 bears against the cam face 25 and the cam face 24 bears against the projection 16, and a second component which is normal to the rear edge 22 and causes the cam faces 25, 24 to urge the rear edge 22 against the abutment 23 as long as the spring 19 is free to hold the projection 18 in abutment with the cam face 25.

An advantage of the improved clamping or retaining means is that the cutting edge 21 of each blade 8 extends beyond the surface 7a to a predetermined extent as long as the distance between the edges 21, 22 of successive blades is identical. The inclination of cam faces 24, 25 on successive blades may but need not be identical, i.e., the configuration of notches 20, 20a on successively mounted blades may but need not be the same, and the notch 20 on a given blade may but need not be exactly mirror symmetrical to the notch 20a. All that counts is to properly select the length of a blade 8 and to provide it with cam faces which can be engaged by the projections 16, 18 when the spring 19 is free to dissipate energy.

It is clear that the improved tool is susceptible of many additional modifications without departing from the spirit of the invention. For example, the projection 18 can be pushed (rather than pulled) toward the projection 16, the cam faces 24, 25 can extend all the way from the rear edge 22 to the cutting edge 21 of a blade (i.e., each such cam face can constitute the respective end surface of the blade), the cam faces can surround portions of slots in the body of the blade, and the pin-shaped projections 16, 18 can be replaced with projections resembling wedges or the like. Still further, each of the projections 16, 18 can be movably mounted on the holder 7 and each projection can be biased by a discrete spring. For example, the portion 15 of the projection 16 can be slidably mounted in the recess 14 and the spring 19 can be used to urge both projections toward each other. Also, the spring 19 may be replaced by a leaf spring, by dished springs, by a hairpin spring or any other means which is capable of biasing the projection 18 toward the projection 16. It is also possible to change the configuration of the notches 20, 20a so that the cam faces which bound portions of the modified notches can be engaged by the projections 16, 18 while the projection 18 tends to move away from the projection 16 and/or vice versa.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a material removing tool, particularly in a rotary tool for removing shavings from wood, a combination comprising a holder having a supporting surface and an abutment extending beyond said surface; a substantially flat blade having an elongated cutting edge, a rear edge located opposite said cutting edge, two major surfaces one of which abuts against said supporting surface, and first and second cam faces; and means for releasably retaining said rear edge in engagement with said abutment, including first and second projections provided on said holder adjacent to said first and second cam faces, at least said first projection being movable with respect to said holder and said retaining means further comprising means for biasing said first projection against said first cam face with a predetermined force having a first component which urges said second cam face against said second projection and a second component which urges said rear edge against said abutment due to engagement of said cam faces with the respective projections, said blade being separable from said holder upon movement of said first projection away from said first cam face against the opposition of said biasing means.

2. A combination as defined in claim 1, wherein said second projection is rigid with said holder.

3. A combination as defined in claim 1, wherein said cam faces are inclined with respect to said rear edge of said blade.

4. A combination as defined in claim 1, wherein said first projection is reciprocable with respect to said holder and said supporting surface has a groove substantially parallel to said rear edge, said first projection having a portion which is slidably received in said groove and said biasing means comprising a spring reacting against said holder and bearing against said first projection to urge the cutter against said first cam face.

5. A combination as defined in claim 1, wherein said blade further comprises first and second end surfaces having first and second notches and said first and second cam faces respectively bound portions of said first and second notches.

6. A combination as defined in claim 1, wherein said cutting edge is parallel to said rear edge and said abutment is an elongated shoulder on said holder.

7. A combination as defined in claim 1, wherein at least one of said projections is a pin.

8. A combination as defined in claim 1, wherein each said cam faces makes with said rear edge an acute angle and said cam faces are inclined in opposite directions.

9. A combination as defined in claim 1, wherein said blade has third and fourth projections respectively located between said rear edge and said first and second projections, said first and second cam faces being provided on said third and fourth projections.

10. A combination as defined in claim 9, wherein said biasing means urges said first projection toward said second projection.

* * * * *